United States Patent [19]

Herden et al.

[11] 4,343,180

[45] Aug. 10, 1982

[54] APPARATUS FOR FURNISHING A SIGNAL INDICATIVE OF THE LOAD OF AN INTERNAL COMBUSTION ENGINE

[75] Inventors: Werner Herden, Stuttgart; Hans Neu, Vaihingen, both of Fed. Rep. of Germany

[73] Assignee: Robert Bosch GmbH, Stuttgart, Fed. Rep. of Germany

[21] Appl. No.: 160,599

[22] Filed: Jun. 18, 1980

[30] Foreign Application Priority Data

Aug. 9, 1979 [DE] Fed. Rep. of Germany ....... 2932336

[51] Int. Cl.[3] ........................................ G01M 15/00

[52] U.S. Cl. ........................................ 73/115; 73/717

[58] Field of Search ................ 73/717, 718, 115, 708, 73/719, 720, 721, 722, 736, 861.47; 361/283; 123/494

[56] References Cited

U.S. PATENT DOCUMENTS 2,070,842 2/1937 Reichel et al. ..................... 73/115
2,907,897 10/1959 Sander ......................... 73/DIG. 3
2,932,807 4/1960 Bourns ........................ 73/719 X
3,068,700 12/1962 Bourns ........................ 73/718 X
3,196,686 7/1965 Cole ........................... 73/720 X
4,131,088 12/1978 Reddy .......................... 123/494

*Primary Examiner*—Jerry W. Myracle
*Attorney, Agent, or Firm*—Frishauf, Holtz, Goodman & Woodward

[57] ABSTRACT

The interior of a differential pressure cell is exposed to the pressure in the intake pipe of an internal combustion engine. An absolute pressure cell is exposed to the ambient air pressure. The movable membrane of the differential pressure cell carries a plate on which are mounted two permanent magnets whose North poles face one another. A Hall generator fastened to the center of the movable membrane of the absolute pressure cell moves in the gap between the two magnets. The effective magnetic field applied to the Hall generator thus varies with the relative position of the Hall generator and the magnets. Adjustment of the spring constants of the two membranes allows any linear combination of differential and absolute pressure to be formed. Embodiments of different complexity and different degrees of linearity are illustrated.

14 Claims, 8 Drawing Figures

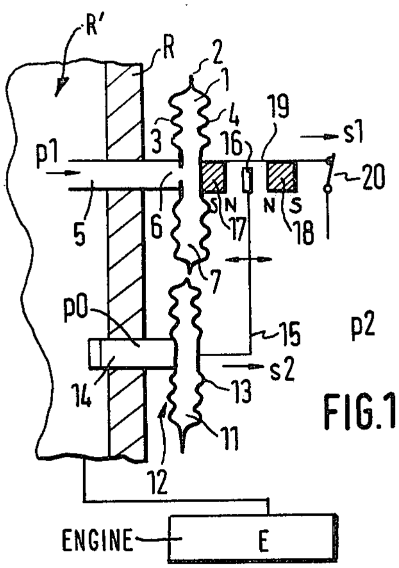
FIG.1
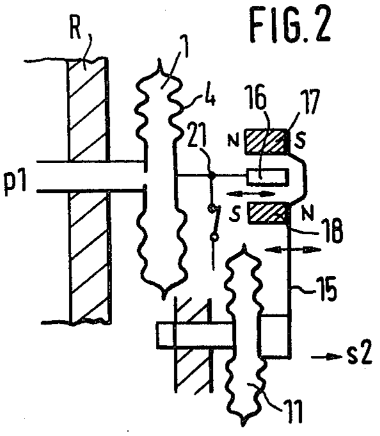
FIG.2
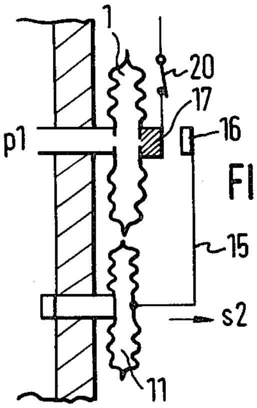
FIG.3
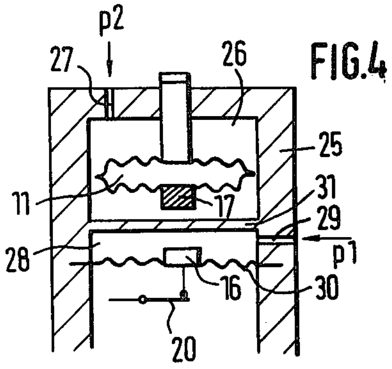
FIG.4
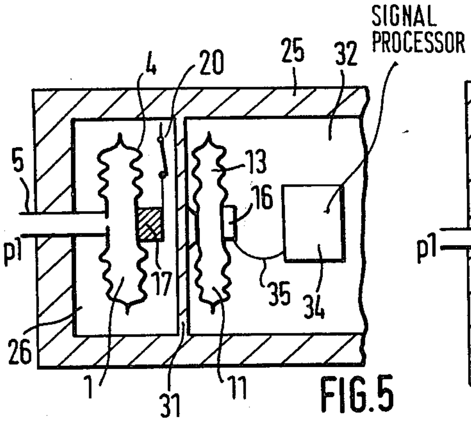
FIG.5
FIG.6
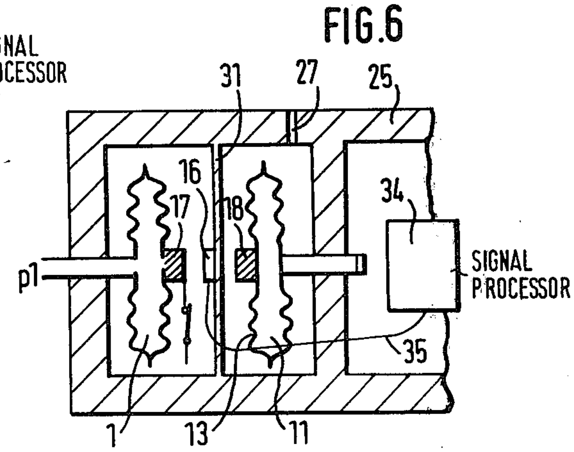

APPARATUS FOR FURNISHING A SIGNAL INDICATIVE OF THE LOAD OF AN INTERNAL COMBUSTION ENGINE

Cross-reference to related applications and publications: U.S. Pat. No. 3,648,155, Sohner et al, to which DE-OS No. 16,73,938 corresponds.

All of the above publications are hereby incorporated by reference into the present application.

The present invention relates to control systems in internal combustion engines, and, more particularly, apparatus which furnishes a signal indicative of the then-present load on the engine. The load signal is then used, for example, to determine the ignition timing and/or the amount of fuel supplied.

BACKGROUND AND PRIOR ART

Pressure transducing apparatus is described in German Patent Disclosure Document No. 16 73 938 to which U.S. Pat. No. 3,648,155 corresponds, in which a permanent magnet is positioned in a magnetic circuit which has an air gap and in which is arranged a Hall generator or Hall resistor. The magnetic field lines in the air gap are changed by means of a movable regulating piece which is positioned in dependence on the amplitude of the parameter being measured, for example on the pressure in the intake pipe in the internal combustion engine.

THE INVENTION

It is an object of the present invention to furnish apparatus which generates a signal indicative of the load on the engine, thereby allowing control of the selected parameter. The apparatus is to function with high accuracy but be simple to construct and inexpensive to implement.

In accordance with the present invention, a pressure transducing means, such as a differential pressure cell, is connected to the intake pipe. Magnetic field generating means, such as a permanent magnet, and a Hall generator mounted in the magnetic field generated by the magnet are provided. The effective magnetic field applied to the Hall generator is varied in accordance with the pressure sensed by the differential pressure cell. The Hall generator therefore furnishes a signal varying in dependence upon the pressure in the intake pipe, which in turn varies in dependence upon the engine load.

More specifically, both a differential pressure cell and an absolute pressure cell are provided, the Hall generator being coupled to a movable bellows in the absolute pressure cell for movement therewith, while the magnet or magnets are coupled to the differential pressure cell. Relative movement between the magnets and the Hall generator causes the variation in effective magnetic field, both as a function of differential and of absolute pressure.

DRAWINGS ILLUSTRATING PREFERRED EMBODIMENTS

FIG. 1 illustrates apparatus for generating a load-varying signal suitable for use in controlling the fuel injection and ignition timing in an internal combustion engine;

FIG. 2 is an alternate embodiment of the present invention utilizing two magnets;

FIG. 3 is a simplified embodiment utilizing only magnet;

FIG. 4 is a diagram illustrating two pressure cells mounted in a common housing;

FIG. 5 illustrates a variation of the apparatus of FIG. 4;

FIG. 6 illustrates a second variation of the apparatus of FIG. 4;

Figure 7:
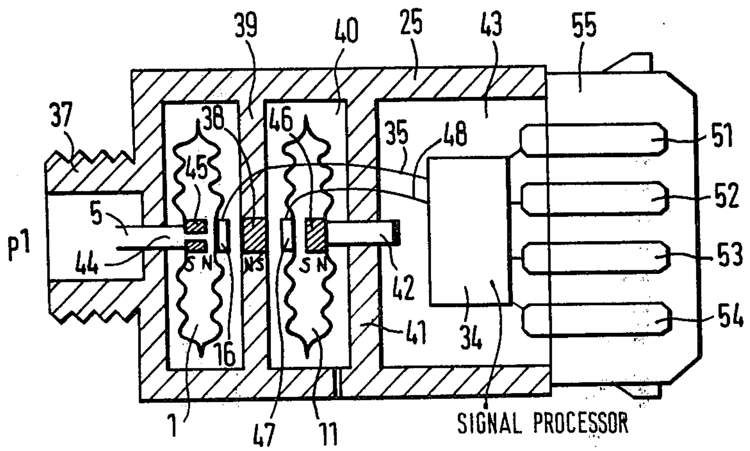
FIG. 7 illustrates a variation of the apparatus of FIG. 4 with additional signal evaluation and shaping apparatus.

In FIG. 1, intake pipe R is shown in a fragmentary lengthwise sectional view, and, the engine E is shown only schematically. A differential pressure cell 1 is mounted on side wall R of intake pipe R and consists of two membranes or bellows 3 and 4 which are circular when viewed in an axial top view and which are soldered together in a pressure-tight manner along edges 2. Membrane 3 is mounted on a connection piece 5 which has an opening connected with the interior of intake pipe R. Membrane 3 has a central bore 6 so that the interior 7 of the differential pressure cell 1 will have the same pressure as the pressure within intake pipe R. This pressure is denoted by p1.

Further, an evacuated absolute pressure cell 11 is provided which also consists of two corrugated membranes 12 and 13 which are of circular shape when viewed in an axial top view. Membrane 12 is mounted on a connecting piece 14 which is fixedly mounted on intake pipe R. One leg of an L-shaped angle 15 is fastened to the center of membrane 13. The other leg of angle 15 carries a Hall generator 16.

The Hall generator or Hall IC 16 is positioned in the gap between two permanent magnets 17 and 18. Like poles of the magnets face each other. Further, the magnets are kept at a fixed distance relative to one another by means of a mounting plate 19 which is connected to membrane 4.

When Hall generator 16 is in the mid-position between permanent magnets 17 and 18 as shown in FIG. 1, then its output voltage V=0. In response to a change in intake pressure p1, both magnets 17 and 18 move together with mounting plate 19 along the path s1. When the pressure in the environment, p2, decreases as can be the case with increasing geographical height, the absolute pressure cell 11 expands. An expansion along the path indicated by s2 in FIG. 1 causes movement of Hall generator 16 relative to permanent magnets 17 and 18. The output voltage V of Hall generator 16 is $$V \approx s1 - s2$$

or $$V = a(p1 - p2) + b \cdot p2$$

where a and b denote the spring constants of the pressure cells, namely that of differential pressure cell 1 and absolute pressure cell 11 respectively. Therefore:

$$V = a \cdot p1 - (a - b)\, p2$$

or $$V = a\left(p1 - \frac{a-b}{a} \cdot p2\right).$$

Thus, any selected linear combination of the two pressures p1 and p2 can readily be achieved, just by selection of the constants a and b. In a particularly preferred embodiment, a=b, so that the output voltage V of the Hall generator 16 is proportional to the pressure p1.

Further shown in FIG. 1 is a switch 20 which is operable, by an extension of mounting plate 19, to close when the pressure p1=p2, that is when the internal combustion engine is operating at full load.

In FIG. 2, as in all the remaining figures, those elements which are the same as or have similar functions as elements shown in FIG. 1 are denoted by the same reference numerals. The schematic showing of engine E has been omitted for clarity of the drawing. It, like the intake pipe R' is similar to the showing in FIG. 1. Here movable membrane 4 of the differential pressure cell 1 carries a rod 21 at whose free end the Hall generator is positioned. Two permanent magnets 17 and 18 are arranged so that their N-S direction of polarization extends parallel to the lengthwise extension of Hall generator 16 and the direction of rod 21. Permanent magnets 17 and 18 are fastened to an angle 15 which is connected to absolute pressure cell 11. The operation of the apparatus shown in FIG. 2 is similar to that of FIG. 1. A switch 20 is also provided, whose movable contact is connected to membrane 4 and which changes its switching state (i.e. from open to closed or closed to open) when the internal combustion engine is operating at full load.

A simplified embodiment of the present invention is shown in FIG. 3. A cylindrical permanent magnet 17 is mounted in the center of membrane 4 of differential pressure cell 1. The magnet is polarized in the axial direction and faces Hall generator 16 across a gap. As in FIG. 1, Hall generator 16 is connected to the absolute pressure cell 11 by an angle 15. Its distance to permanent magnet decreases with increasing absolute pressure p2.

In the embodiments shown in FIGS. 4–8, a common housing 25 is provided in which both the differential pressure cell 1 and the absolute pressure cell 11 are mounted. The position of the two cells relative to one another is thus mechanically fixed in a reliable and highly stable manner. Specifically, housing 25 has a first chamber 26 which holds the absolute pressure cell 11. A bore 27 causes chamber 26 to be at the same pressure as the surrounding air pressure p2. Moving membrane 4 carries a permanent magnet 17 which, as in FIG. 1, is polarized in the axial direction of the associated pressure cell. The second chamber 28 is connected through a bore 29 with the interior of the intake pipe R of an internal combustion engine. The pressure in chamber 28 is thus the intake pressure p1. The second chamber 28 is shielded against the external pressure by a corrugated membrane 30 at the center of which Hall generator 16 is mounted in a direction facing magnet 17. A thin partition 31 separates chambers 26 and 28 from one another. When the absolute pressure in the intake pipe is small, membrane 30 and thus Hall generator 16 move toward permanent magnet 17. Permanent magnet 17 moves away from partition 31 for increasing external (ambient) air pressure p2.

In contrast to the above-described embodiment, the differential pressure cell 1 in FIG. 5 is positioned in the chamber 26 created by partition 31, the connecting piece 5 being open to the interior of the intake pipe. The side of movable membrane 4 of differential pressure cell 1 which faces away from connecting piece 5 carries a permanent magnet 17 polarized in the axial direction of pressure cell 1 and mechanically coupled to a full load switch 20. The magnetic field of permanent magnet 17 passes through the thin partition 31 and is applied to a Hall generator 16 which is positioned on movable membrane 13 of absolute pressure cell 11. The latter is mounted on partition 31.

A second chamber 32 is exposed to the ambient air pressure. It also contains electrical circuits 34 for zeroing and signal shaping of the output signal V of Hall generator 16. Preferably, electrical circuits 34 consist of integrated circuits. These may be either passive or active circuits. The amplitude of the output voltage of Hall generator 16 of course changes with changes in the distance of permanent magnet 17 from Hall generator 16.

In the embodiment shown in FIG. 6, Hall generator 16 is mounted on the side of partition 31 which faces differential pressure cell 1. It is influenced by the magnetic field of a permanent magnet 17 which is connected to differential pressure cell 1 and of permanent magnet 18 which is mounted on the side of membrane 13 of absolute pressure cell 11 which faces partition 31. Pressure cells 1 and 11 are mounted coaxially and magnets 17 and 18 are polarized in the direction of the common axis of the two pressure cells in such a way that poles of the same polarity face Hall generator 16. As in the previously described embodiment, the output voltage of Hall generator 16 is applied through a two-conductor line 35 to electronic circuits 34. The latter are also mounted in housing 25.

Figure 8:
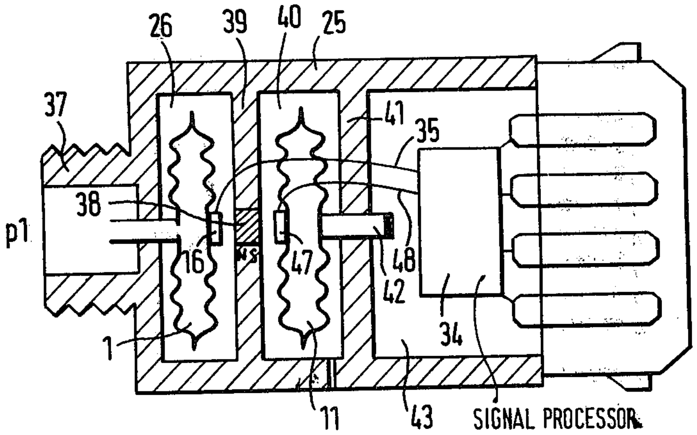
FIG. 8 is a variation of the apparatus shown in FIG. 7.

The embodiments shown in FIGS. 7 and 8 are of particularly simple construction. A metal housing 25 which is particularly stable and able to absorb even strong vibrations and shock is common to both embodiments. In both cases, the housing has a threaded stem 37 at one of its faces which allows the housing to be screwed into the intake pipe of an internal combustion engine. The interior of differential pressure cell 1 is at the pressure p1 in the intake pipe, i.e. the pressure which signifies the then-present load of the internal combustion engine. In both embodiments, an axial elongation of differential pressure cell 1 carries a permanent magnet 38. Permanent magnet 38 is polarized in the axial direction and is mounted in a partition 39 which separates the first chamber 26 from a second chamber 40 which is exposed to the ambient air pressure and in which the absolute pressure cell 11 is mounted. The latter is mounted on a connecting piece 42 which in turn is mounted in a second partition 41 and is movable therein in the axial direction. Partition 31 separates chamber 40 from a third chamber 43. The latter holds the electronic circuits 34 in both embodiments.

In the embodiment shown in FIG. 7, permanent magnet 45 is mounted in the interior of differential pressure cell 1 (in such a manner that the pressure therein continues to change with pressure changes in the intake pipe). Permanent magnet 45 is also polarized in the common axial direction, the North pole of permanent magnet 38 facing a North pole of permanent magnet 45. In contrast thereto, an axially polarized magnet 46 in absolute pressure cell 11 has a South pole facing the South pole of permanent magnet 38. In this embodiment, two Hall generators or Hall-IC's are provided, a first Hall generator 16 being mounted on the external side of movable membrane 4 of differential pressure cell 1, a second Hall generator 47 being mounted on the exterior side of the movable membrane of absolute pressure cell 11. The above-described arrangement of Hall generators 16 and 47 between poles of the same polarity of permanent magnets 45 and 38, and 38 and 46, respectively has the advantage that a very high degree of linearity of output voltages V1 and V2 of the two Hall generators as a function of movement of the pressure cells 11 and 1 results. These output voltages are each applied through respective two-conductor lines 35 and 48 to the balancing and signal processing electronic circuits 34 which are mounted in the third chamber 43. Electronic circuits 34 are connected to four terminals 51–54, two of which allow the application of a supply voltage, while the remaining two supply the differential pressure signal and the absolute pressure signal. The connection can be made by a standard jack-plug connection, the plug being designated by reference numeral 55.

The embodiment shown in FIG. 8 is simplified relative to that shown in FIG. 7. Specifically, only one central permanent magnet 38 is provided which supplies the magnetic field for both Hall generator 16 and Hall generator or Hall-IC 47. However, the output voltages, i.e. the Hall generator output voltages for the embodiment shown in FIG. 8 are substantially less linear with respect to the movement of the associated membranes, i.e. with respect to the associated pressures than are the voltages furnished by the arrangement in FIG. 7.

Various changes and modifications may be made within the scope of the inventive concepts.

We claim:

1. In an internal combustion engine having an intake pipe and means for controlling the fuel supply in accordance with the then-present load on said internal combustion engine, apparatus for furnishing a load signal indicative of said then-present load, comprising absolute pressure transducing means (11);

differential pressure transducing means (1) connected to said intake pipe (R);

means (17) for generating a magnetic field varying in accordance with the pressure sensed by at least one of said pressure transducing means including a first magnet and a second magnet, said magnets being so arranged that a pole of said second magnet faces a pole of the first magnet of the same polarity; and Hall generator means mounted in said magnetic field for generating an output signal varying as a function thereof, said output signal constituting said load signal.

2. Apparatus as set forth in claim 1, wherein at least one of said pressure transducing means comprises a cell having bellows.

3. Apparatus as set forth in claim 2, wherein said differential pressure transducing means and said absolute pressure transducing means comprises, respectively, a first and second cell having bellows.

4. Apparatus as set forth in claim 3, wherein said first and second cells are mounted coaxially to one another.

5. Apparatus as set forth in claim 3, wherein said means for generating a magnetic field comprises a permanent magnet; wherein said permanent magnet is mounted in the interior of one of said cells.

6. Apparatus as set forth in claim 1, wherein said magnetic field generating means comprises a permanent magnet.

7. Apparatus as set forth in claim 1, wherein said first and second magnets are permanent magnets.

8. Apparatus as set forth in claim 1, wherein said Hall generator means is mounted in a gap between said poles of said first and second magnets.

9. Apparatus as set forth in claim 8, wherein said first and second magnets are mounted on the same selected one of said pressure transducing means.

10. Apparatus as set forth in claim 1, further comprising switch means (20) coupled to at least one of said pressure transducing means for switching from a first to a second state when the pressure sensed by said pressure transducing means is a predetermined pressure.

11. Apparatus as set forth in claim 10, wherein said switch means comprises a contact mounted in a fixed position.

12. In an internal combustion engine having an intake pipe and fuel supply control means operative at least in part in accordance with a load signal indicative of the then-present load on said internal combustion engine, apparatus for furnishing said load signal comprising pressure transducing means (1) having at least one element (4) moving in response to pressure changes in said intake pipe;

means (17, 18) for generating a magnetic field including a first magnet and a second magnet, said magnets being so arranged that a pole of said second magnet faces a pole of the first magnet of the same polarity; and Hall generator means (16) positioned in said magnetic field for generating an output signal varying as a function of magnetic field strength applied thereto, said output signal constituting said load signal; and means (19) for coupling a selected one of said magnets and said Hall generator means to said at least one element of said pressure transducing means so that said magnetic field applied to said Hall generator means changes in dependence on changes in said pressure in said intake pipe.

13. Apparatus as set forth in claim 12, wherein said pressure transducing means comprises a differential pressure cell (1) and an absolute pressure cell (11) having, respectively, a first and second element moving in response to pressure applied thereto; and wherein said magnetic field generating means is connected to a selected one of said moving elements and said Hall generator means is connected to the other of said moving elements for movement therewith.

14. Apparatus as set forth in claim 13, wherein said magnetic field generating means is coupled to said moving element of said differential pressure cell and said Hall generator means is coupled to said moving element of said absolute pressure cell.

* * * * *